United States Patent Office 3,554,959
Patented Jan. 12, 1971

3,554,959
RUBBER ANTIOXIDANTS
David Alan Hammersley, Bangor-on-Dee, Wales, and John Payne, Oswestry, England, assignors to Monsanto Chemicals Limited, London, England, a British company
No Drawing. Filed June 1, 1967, Ser. No. 642,711
Claims priority, application Great Britain, June 14, 1966, 26,388/66
Int. Cl. C08d *11/04;* C08f *45/60*
U.S. Cl. 260—41.5                      7 Claims

ABSTRACT OF THE DISCLOSURE

The disclosure is a pulverulent or pulverizable antioxidant composition suitable for incorporation in rubber, which comprises a blend of a liquid or non-pulverizable solid phenolic rubber antioxidant absorbed on a finely divided absorbent solid and a solid, nitrogen-containing rubber antioxidant in finely divided form.

BACKGROUND OF THE INVENTION

The invention pertains to the field of rubber antioxidant art. In the manufacture of vulcanized rubber articles, antioxidants are normally incorporated in the rubber in order to give the subsequently vulcanized product a longer life. Most rubber antioxidants are either phenols or amines, and within both groups some members are solids which can be obtained in finely divided, free-flowing form at ordinary temperatures, while some are liquids or non-pulverizable solids. In general, the rubber industry prefers to use free-flowing solids since these are considered more convenient to handle and the quantities for incorporation in rubber can be measured more accurately than can liquids.

One solution that has been proposed to the problem associated with the use of liquid antioxidants is that they should be absorbed on free-flowing absorbent solid such as kieselguhr. Such solids are themselves substantially without antioxidant activity.

Shaffer E. Horne's U.S. Patent 3,218,292 (Cl. 260—45.9) 1965, assigned to Monsanto Company, discloses stabilizing polyethylene with calcium silicate and an amine or phenol.

SUMMARY OF THE INVENTION

We have found that a blend of a phenolic antioxidant absorbed on an absorbent solid and a nitrogen-containing rubber antioxidant which is a solid under ordinary atmospheric conditions exhibits greater antioxidant activity than would be expected on the basis of the individual antioxidants present.

Accordingly, the present invention includes a pulverulent or pulverizable antioxidant composition suitable for incorporation in rubber, which comprises a blend of a liquid or non-pulverizable solid phenolic rubber antioxidant absorbed on a finely divided absorbent solid and a solid, nitrogen-containing rubber antioxidant in finely divided form.

The invention includes a process for the production of vulcanized rubber having improved durability, in which an antioxidant composition as defined above is incorporated into rubber and the mixture is subsequently vulcanized. The invention also includes the rubber vulcanizate.

DESCRIPTION OF THE PREFERRED EMBODIMENTS

The term "liquid" as applied in this specification to rubber antioxidants means materials which are, to some extent at least, fluid at atmospheric temperatures to be met with in practice. Thus there are included materials ranging from thin mobile liquids to thick semi-solid materials which are so viscous as to be only just capable of flowing. By "non-pulverizable solid" is meant a material which is not liquid in the above sense but has a tacky, gummy, or resinous nature such that it cannot be pulverized and retain its free-flowing power under atmospheric conditions to be met with in practice.

Freshly produced antioxidant compositions of the invention are free-flowing powders, but they may tend to cake somewhat on storage. Aggregates formed by caking are, however, readily pulverized on the application of slight pressure to resume a free-flowing form.

The main application of the phenolic antioxidants is in white and light colored rubbers, where the use of nitrogen-containing antioxidants at their normal level is precluded because of their general tendency to discolor the rubber to a significantly greater extent that the phenolics. The particular value of the antioxidant compositions of of the present invention lies in the same field of application. The presence in the composition of a phenolic antioxidant, and the synergism between the phenolic and nitrogen-containing antioxidant permits the amount of the latter introduced into the rubber to be reduced to a level corresponding to an acceptable degree of discoloration while retaining effective antioxidant protection. Some nitrogen-containing antioxidants are less discoloring than others, and a preferred nitrogen-containing antioxidant for use in the composition of the invention is a 1,2-dihydro-2,2,4-trimethylquinoline polymer.

Chemically, the phenolic antioxidants are generally derivatives of mononuclear monohydric phenols or of dinuclear phenols in which two monohydric phenol nuclei are joined through an alkylene group or sulfur atom, containing at least one alkyl (usually tertiary alkyl), alkylcycloalkyl or aralkyl group as a nuclear substituent. Not all phenolic antioxidants are liquids at ordinary temperatures, and of the commercially available materials that are, the liquidity is in many instances attributable at least in part to the fact that the process employed for their manufacture leads to the production of a mixture of compounds. A particularly effective liquid phenolic antioxidant for use in the antioxidant composition of the invention, for example, is a mixture of α-methylbenzylated phenols obtainable by the reaction of approximately 2 molar proportions of styrene with one molar proportion of phenol. Under the usual reaction condtions, the major component of the product of this reaction is 2,4-bis(α-methylbenzyl)phenol, but there are also present 2,6-bis(α-methylbenzyl)phenol and 2,4,6 - tris(α-methylbenzyl) phenol.

Other useful liquid phenolic antioxidants are those produced by the alkylation of phenol or cresols with mixtures of olefins such as for instance isobutylene and diisobutylene, and the mixtures of tertiary butylated and α-methylbenzylated products obtained by the action of isobutylene-styrene mixtures on mononuclear and dinuclear phenols; the material known as nonylated 2,2'-dihydroxy-5,5'-dimethyldiphenyl methane which can be obtained by the alkylation of 2,2'-dihydroxy-5,5'-dimethyldiphenyl methane with propylene trimer; condensation products of aliphatic aldehydes, for example butyraldehyde, with xylenols; a reaction product of sulfur dichloride with 6-tertiary butyl-m-cresol; 2,4-dimethyl-6-(α-methylcyclohexyl)phenol; a product obtained by the action of isobutylene or isobutanol on 2,4-bis(p-hydroxyphenyl)propane to give a mixture of compounds containing from one to four tertiary butyl groups.

A finely divided calcium silicate is particularly effective as the absorbent solid in a composition of the invention. Other materials that can be used include magnesium silicates (e.g. talc and sepiolite), silica, kieselguhr, fuller's earth, bentonite, and other siliceous or aluminous substances. For satisfactory dispersion of the antioxidant composition in rubber, the state of subdivision of the absorbent solid should generally be such that less than 0.5% is retained on a 200 British Standard Sieve (B.S.S.) mesh and preferably not more than 50% is retained on a 300 B.S.S. mesh.

A fine state of subdivision is also desirable from the point of view of the ability of the solid to absorb the liquid phenolic antioxidant, since the surface area per unit weight and hence in general, the weight of antioxidant absorbable per unit weight, increases as the particle size decreases. Other factors, however, such as the internal structure of the solid particle and the nature of the individual phenolic antioxidant, also determine the absorptive capacity of the solid in any particular instance.

A variety of nitrogen-containing organic substances are known that are solids capable of existing in free-flowing finely divided form at ordinary atmospheric temperatures and that are antioxidants for rubber. Many of these are aromatic secondary amines, for example phenyl β-naphthyl - amine, N,N' - diphenyl - p - phenylenediamine, N,N' - di - β - naphthyl - p - phenylenediamine, and p,p'-dimethoxydiphenylamine. Where, as is generally the case, a composition of the invention is intended for use in a white- or light-colored rubber vulcanizate, however, the preferred nitrogen-containing antioxidant is a polymeric 1,2 - dihydro - 2,2,4 - trimethylquinoline. The commercially available materials of this type generally contain from 2 to 5 dihydroquinoline units in the polymer molecule and melt over a range of temperature within the broad range 65° C. to 130° C. Polymers having melting ranges towards the upper end of the broad range, for example from 100° C. to 130° C. are preferred. Of the secondary amines referred to above, N,N'-di-β-naphthyl-p-phenylenediamine is most suitable as the nitrogen-containing antioxidant in a composition of the invention.

The state of subdivision of the nitrogen-containing antioxidant should conform with the normal requirements for a solid that is to be dispersed in rubber, as indicated above with references to the finely divided absorbent solid, unless its melting point is such that it will liquify at the temperature at which the composition is incorporated into the rubber.

The proportions of the various components in an antioxidant composition of the invention and the level at which the composition is incorporated into rubber are determined largely by the following considerations. The amount of the composition added to the rubber will normally contain from 1.0 to 3.0 parts by weight per 100 parts by weight of rubber of the phenolic antioxidant, although amounts such that the phenolic antioxidant content lies within a broader range than this, for example from 0.5 to 5 parts by weight per 100 parts by weight of rubber, can be used.

For economic reasons, the quantity of liquid phenolic antioxidant which is absorbed on to the finely divided solid is usually the maximum consistent with the retention of free-flowing properties by the solid, although lesser amounts are functionally satisfactory. Often, finely divided absorbent solids as exemplified above can absorb at least their own weight of liquid phenolic antioxidant while retaining the appearance and properties of a free-flowing powder; usually the proportion by weight of phenolic antioxidant to absorbent solid in a composition of the invention lies within a range of from 1:2 to 1:0.8.

While synergism between the antioxidant components in a composition of the invention is shown over a wide range of proportions, the maximum amount of the nitrogen-containing antioxidant which is acceptable in practice is usually determined by the need to avoid undue staining and discoloration when the compositions are used in white- and light-colored rubbers. The limit thereby imposed depends on the particular nitrogen-containing antioxidant concerned and the degree of staining and/or discoloration which can be tolerated, but is usually about 0.75 part by weight per 100 parts by weight of rubber for the antioxidants, such as the polymeric 2,2,4-trimethyl-1,2-dihydroquinolines, which discolor least. Preferably not more than 0.5 part by weight of the nitrogen-containing antioxidant per 100 parts by weight of rubber is used. For maximum protection, the amount of the composition incorporated into the rubber will be that containing the full amount of the nitrogen-containing antioxidant that can be tolerated. Lesser amounts can be used however in cases where a lower degree of protection can be accepted, the practical minimum being generally about 0.3 part by weight per 100 parts by weight of rubber. Considered in conjunction with the figures given above for the amount of the phenolic antioxidant to be added to the rubber, this means that the proportions by weight of phenolic antioxidants to nitrogen-containing antioxidant in a composition of the invention will generally be within the limits of 1:0.06 to 1:1.5, the preferred range being from 1:0.16 to 1:0.5.

It is clear that within the general limits discussed above the proportions of the components in the antioxidant composition of the invention and the levels at which the compositions can be used in rubber can be varied widely.

In the production of the compositions of the invention, it is generally preferable to add the phenolic antioxidant to the finely divided absorbent solid to give a free-flow powder which is then blended with the nitrogen-containing antioxidant, or to add the phenolic antioxidant to a mixture of the absorbent and the nitrogen-containing antioxidant. The incorporation of a phenolic antioxidant that is a viscous liquid or non-pulverizable solid at ordinary atmospheric temperatures is facilitated by heating to a temperature at which it is sufficiently mobile to permit ready absorption by the finely divided solid. It is sometimes preferable in such circumstances to warm the absorbent solid to approximately the same temperature as the phenolic antioxidant. The mixing operation can for example be conducted in a mechanical mixer fitted with a steam-heated jacket.

The rubbers in which the compositions of the invention can be used are those for which the antioxidant components of the composition provide protection, for example natural rubber and synthetic rubbers such as for instance polybutadiene, polyisoprene, copolymers of 1,3-butadiene with styrene, acrylonitrile, isobutylene or methyl methacrylate, and ethylene-propylene terpolymer rubbers.

The antioxidant composition can be incorporated into the rubber by conventional means, using for example a roll mill or an internal mixer. Where the process is used to produce a vulcanized rubber having improved resistance to deterioration, the composition is normally incorporated into the rubber prior to vulcanization together with other commonly used ingredients, such as for instance zinc oxide, stearic acid, a filler, a pigment, a vulcanizing agent and a vulcanization accelerator. The choice of such ingredients where a white- or light-colored product is required is well known. Suitable fillers, for example, include barium sulfate, calcium and magnesium carbonates, various clays, and silica. Titanium dioxide is often used as a pigment in the production of white vulcanizates. The vulcanization proper, in which the mixture so obtained is heated, is carried out at a temperature appropriate to the particular rubber concerned, for example at a temperature of about 135° to 155° C. where the composition is based on natural rubber, or at a temperature of about 140°–160° C. where the composition is based on a styrene-butadiene rubber.

The antioxidant composition can also be used to protect an unvulcanized rubber. Incorporation can then be by milling into the solid rubber, but very often, and particularly where the rubber is synthetic, the composition is more conveniently dispersed in a latex or solution of the rubber, for example one obtained during its manufacture. An additive used in this way is generally referred to as a stabilizer for the synthetic rubber.

The invention is illustrated by the following examples:

Example 1

This example describes the production of an antioxidant composition according to the invention.

The liquid phenolic antioxidant employed consisted essentially of a mixture of (α-methylbenzyl)phenols (hereinafter referred to as distyrenated phenol) in which 2,4-bis(α-methylbenzyl)phenol was the major component. The nitrogen-containing antioxidant was a polymer of 1,2-dihydro - 2,2,4 - trimethylquinoline having a melting point (complete) of approximately 125° C. and a particle size range such that 99.9% passed a 200 B.S.S. mesh sieve. A calcium silicate having an ultimate particle size of less than 50 millimicrons by electron microscopy and an oil adsorption (B.S. 1795) of 140%, was employed as the absorbent solid.

Seventeen pounds of the dihydroquinoline polymer and 50 pounds of the calcium silicate were mixed for 10 minutes in a mixer designed to handle the blending of powders. Thirty-three pounds of the distyrenated phenol at 60° C., its viscosity at this temperature being 63 centistokes, were then sprayed on to the stirred mixture over a period of 5 minutes, and mixing was continued for a further 10 minutes. The final product was a free-flowing powder.

The composition was evaluated as an antioxidant in a white rubber stock and the synergism between the phenolic and the nitrogen-containing antioxidants was demonstrated by the following test method.

The composition of the base stock was as follows:

| | Parts by weight |
|---|---|
| Pale crepe | 100 |
| Zinc oxide | 5 |
| Stearic acid | 1 |
| Precipitated barium sulfate | 50 |
| Titanium dioxide | 5 |
| Sulfur | 2.5 |
| 2-benzothiazyl disulfide | 1 |

Several series of vulcanized test pieces were prepared by incorporating into samples of the base stock the composition described above, the individual antioxidant components of the blend, and a mixture of the distyrenated phenol and dihydroquinoline polymer in the proportions in which they occurred in the composition, at the various levels shown in the table below, and vulcanizing at 153° C. for 25 minutes. Control pieces containing no antioxidant were also prepared. Each series was duplicated in a corresponding series of test pieces vulcanized at 153° C. for 30 minutes.

The effectiveness of the antioxidant or antioxidant composition in each series of test pieces was assessed by measuring the tensile strengths of unaged members of the series and the tensile strengths of members after aging at 90° C. in an air oven for periods of from one to four weeks.

In the table below, the average retention of tensile strength is the average tensile strength of all test pieces containing a given level of antioxidant or antioxidant composition after aging for 2, 3, and 4 weeks expressed as a percentage of the tensile strength of the same vulcanizate before aging. Where there was a difference between the unaged tensile strengths of the vulcanizates produced at the two different cure times, the higher of the two tensile strengths was taken as the divisor.

| Antioxidant or antioxidant composition | Level (parts by weight per 100 parts by weight of rubber) | Average percent tensile retention |
|---|---|---|
| None control | | 17 |
| None calcium silicate | 1.0 | 15 |
| Distyrenated phenol | 0.3325 | 29 |
| Dihydroquinoline polymer | 0.1675 | |
| Antioxidant composition | 0.5 | 27 |
| | 1.0 | 34 |
| | 1.5 | 42 |
| | 2.0 | 46 |
| | 3.0 | 48 |
| | 4.0 | 50 |
| Distyrenated phenol | 1.0 | 28 |
| | 2.0 | 32 |
| | 3.0 | 35 |
| Dihydroquinoline polymer | 0.5 | 38 |
| | 1.0 | 43 |
| | 2.0 | 46 |

The synergism between the components of the blend is shown by comparing the average percent tensile retention (34) of the vulcanizate containing 1.0 part of the antioxidant composition with that (29) of the vulcanizate containing a mixture of distyrenated phenol and dihydroquinoline polymer each at the same level as in 1.0 part of the composition (0.3325 and 0.1675 part respectively). The second result quoted in the table shows, moreover, that calcium silicate alone has no antioxidant activity.

Synergism can be shown to exist at other levels by calculation as follows:

The dihydroquinoline polymer alone is a much more effective antioxidant than the distyrenated phenol alone, and from the above figures it can be seen that one part of the latter is required to give the same degree of protection as 0.2 to 0.3 part of the former.

On this basis, the mixture of antioxidants in the antioxidant composition at 3 parts by weight per 100 parts by weight of rubber, for example, i.e. 0.5 part by weight of the dihydroquinoline polymer and 1.0 part by weight of the distyrenated phenol per 100 parts by weight of rubber would be expected to give protection equivalent to 0.7 to 0.8 part by weight of the dihydroquinoline polymer, namely an average tensile retention of approximately 40. The average tensile retention calculated on the basis of the actual results given by vulcanizates containing 3 parts by weight of the antioxidant composition is, however, 48.

Example 2

Blends in which the three components of the mixture described in Example 1 were present in the percentages by weight shown in the following table were also prepared:

| Distyrenated phenol | Dihydroquinoline polymer | Calcium silicate |
|---|---|---|
| 40 | 10 | 50 |
| 35 | 15 | 50 |
| 30 | 20 | 50 |
| 25 | 25 | 50 |
| 50 | 10 | 40 |
| 40 | 20 | 40 |
| 35 | 25 | 40 |
| 30 | 30 | 40 |

In each instance the initial product was a free-flowing powder. The tendency to cake on storage became more marked as the proportion of distyrenated phenol to calcium silicate in the blend increased, but in all cases aggregates formed by caking were readily broken down under slight pressure.

It is intended to cover all changes and modifications of the examples of the invention herein chosen for purposes of disclosure which do not constitute departures from the spirit and scope of the invention.

We claim:
1. Vulcanized diene rubber containing an antioxidant amount of a pulverizable antioxidant composition comprising:
   a synergistic blend of a liquid or non-pulverizable solid phenolic rubber antioxidant absorbed on finely divided calcium silicate, and a
   solid nitrogen-containing rubber antioxidant in finely divided form, said phenolic rubber antioxidant being a mixture of alpha methylbenzylated phenols, phenol or cresol alkylated with a mixture of olefins, nonylated 2,2'-dihydroxy-5,5'-dimethyldiphenylmethane, condensation product of butylaldehyde with xylenol, reaction product of sulfur dichloride with 6-tertiary butyl-m-cresol, 2,4-dimethyl-6(alpha methylcyclohexyl)phenol or butylated 2,4-bis(p-hydroxyphenyl)propane containing from one to four tertiary butyl groups, and said nitrogen containing antioxidant being polymeric 1,2-dihydro-2,2,4-trimethylquinoline, phenyl beta naphthylamine, N,N'-diphenyl-p-phenylenediamine, N,N'-di(beta naphthyl)-p-phenylenediamine or p,p'-dimethoxydiphenylamine.

2. A vulcanized rubber according to claim 1 in which the phenolic antioxidant of the composition is a mixture of α-methylbenzylated phenols, obtained by the reaction of approximately 2 molar proportions of styrene with one molar proportion of phenol and the nitrogen-containing antioxidant is polymeric 1,2-dihydro-2,2,4-trimethylquinoline, the proportion by weight of phenolic antioxidant to calcium silicate being from 1:2 to 1:0.8 and the preparation by weight of phenolic antioxidant to nitrogen containing-antioxidant being 1:0.06 to 1:1.5.

3. A process for improving the durability of diene rubber subject to oxidative deterioration which comprises:
   incorporating into the rubber an antioxidant amount of a pulverizable synergistic antioxidant composition comprising
       a blend of a liquid or non-pulverizable solid phenolic rubber antioxidant absorbed on finely divided calcium silicate, and
       a solid nitrogen-containing rubber antioxidant in finely divided form, said phenolic rubber antioxidant being a mixture of alpha methylbenzylated phenols, phenol or cresol alkylated with a mixture of olefins, nonylated 2,2'-dihydroxy-5,5' - dimethyldiphenylmethane, condensation product of butylaldehyde with xylenol, reaction product of sulfur dichloride with 6-tertiary butyl-m-cresol, 2,4 - dimethyl - 6(alpha methylcyclohexyl)phenol or butylated 2,4-bis(p-hydroxyphenyl)propane containing from one to four tertiary butyl groups, and said nitrogen containing antioxidant being polymeric 1,2-dihydro - 2,2,4 - trimethylquinoline, phenyl beta naphthylamine, N,N' - diphenyl-p-phenylenediamine, N,N' - di(beta naphthyl)-p-phenylenediamine or p,p'-dimethoxydiphenylamine.

4. A process for improving the durability of a rubber subject to oxidative deterioration according to claim 8 in which the phenolic antioxidant of the composition is a mixture of α-methylbenzylated phenols, obtained by the reaction of approximately 2 molar proportions of styrene with one molar proportion of phenol and the nitrogen-containing antioxidant is polymeric 1,2-dihydro-2,2,4-trimethylquinoline, the proportion by weight of phenolic antioxidant to calcium silicate being from 1:2 to 1:0.8 and the proportion by weight of phenolic antioxidant to nitrogen-containing antioxidant being 1:0.06 to 1:1.5.

5. A process according to claim 4, in which the amount of the composition incorporated into the rubber and the proportions of the phenolic and polymeric 1,2-dihydro-2,2,4-trimethylquinoline antioxidants in the composition are such that the product contains from 1.0 to 3.0 parts by weight of the phenolic antioxidant and from 0.3 to 0.5 part by weight of the polymeric 1,2-dihydro-2,2,4-trimethylquinoline per 100 parts by weight of rubber.

6. A process for improving the durability of a rubber subject to oxidative deterioration according to claim 7 in which the phenolic antioxidant of the composition is a mixture of α-methylbenzylated phenols, obtained by the reaction of approximately 2 molar proportions of styrene with one molar proportion of phenol and the nitrogen-containing antioxidant is polymeric 1,2-dihydro-2,2,4-trimethylquinoline, the proportion by weight of phenolic antioxidant to calcium silicate being from 1:2 to 1:0.8 and the proportion by weight of phenolic antioxidant to nitrogen-containing antioxidant being 1:0.06 to 1:1.5 and the amount of the blend is 1.0–4 parts by weight per 100 parts of rubber.

7. A process for improving the durability of diene rubber subject to oxidative deterioration which contains additives required for the production of a white- or light-colored vulcanized rubber comprising:
   incorporating into the rubber an antioxidant amount of a pulverizable antioxidant composition comprising
       a synergistic blend of a liquid or non-pulverizable solid phenolic rubber antioxidant absorbed on finely divided calcium silicate, and
       a solid nitrogen-containing rubber antioxidant in finely divided form, said phenolic rubber antioxidant being a mixture of alpha methylbenzylated phenols, phenol or cresol alkylated with a mixture of olefins, nonylated 2,2'-dihydroxy-5,5' - dimethyldiphenylmethane, condensation product of butylaldehyde with xylenol, reaction product of sulfur dichloride with 6-tertiary butyl-m-cresol, 2,4 - dimethyl - 6(alpha methylcyclohexyl)phenol or butylated 2,4-bis(p-hydroxyphenyl)propane containing from one to four tertiary butyl groups, and said nitrogen containing antioxidant being polymeric 1,2-dihydro - 2,2,4 - trimethylquinoline, phenyl beta naphthylamine, N,N' - diphenyl-p-phenylenediamine, N,N'-di(beta naphthyl)-p-phenylenediamine or p,p'-dimethoxydiphenylamine.

References Cited

UNITED STATES PATENTS

| | | | |
|---|---|---|---|
| 3,054,769 | 9/1962 | Pike | 260—37 |
| 3,218,292 | 11/1965 | Horne | 260—45.9 |
| 3,352,820 | 11/1967 | Bawn | 260—45.95 |

OTHER REFERENCES

The Vanderbilt Rubber Handbook, G. G. Winspear, editor, 1958, R. T. Vanderbilt Co., pp. 188, 184.

Morton: "Introduction to Rubber Technology," 1959, Reinhold Pub. Co., New York, pp. 144–150.

MORRIS LIEBMAN, Primary Examiner

P. R. MICHL, Assistant Examiner

U.S. Cl. X.R.

260—45.8, 45.9, 45.95